US008743253B2

(12) United States Patent
Okano et al.

(10) Patent No.: US 8,743,253 B2
(45) Date of Patent: Jun. 3, 2014

(54) METHOD OF CONTROLLING READ ADDRESS, PHYSICAL INFORMATION ACQUISITION APPARATUS, AND SEMICONDUCTOR DEVICE

(75) Inventors: Masafumi Okano, Kanagawa (JP); Hiroki Ui, Tokyo (JP)

(73) Assignee: Sony Corporation, Tokyo (JP)

( * ) Notice: Subject to any disclaimer, the term of this patent is extended or adjusted under 35 U.S.C. 154(b) by 2198 days.

(21) Appl. No.: 11/214,527

(22) Filed: Aug. 30, 2005

(65) Prior Publication Data

US 2006/0072168 A1 Apr. 6, 2006

(30) Foreign Application Priority Data

Sep. 2, 2004 (JP) ................ P2004-255341

(51) Int. Cl.
*H04N 3/14* (2006.01)
*H04N 1/04* (2006.01)

(52) U.S. Cl.
USPC .......................................... 348/302; 358/482

(58) Field of Classification Search
USPC .................. 348/294, 300–308; 358/482
See application file for complete search history.

(56) References Cited

U.S. PATENT DOCUMENTS

| 4,368,491 | A | * | 1/1983 | Saito ........................... 358/3.23 |
| 4,967,274 | A | * | 10/1990 | Sonoda ........................ 348/719 |
| 5,469,225 | A | * | 11/1995 | Hong ........................... 348/625 |
| 5,751,375 | A | * | 5/1998 | Ninomiya et al. ........... 348/571 |
| 5,822,236 | A | * | 10/1998 | Dosho et al. .................. 365/45 |
| 5,914,728 | A | * | 6/1999 | Yamagishi et al. .......... 345/565 |
| 5,933,161 | A | * | 8/1999 | Sato et al. ...................... 347/12 |
| 6,122,442 | A | * | 9/2000 | Purcell et al. ................ 345/620 |
| 6,580,456 | B1 | * | 6/2003 | Jacobs ........................... 348/312 |
| 6,633,331 | B1 | * | 10/2003 | Potter et al. ............... 348/207.11 |
| 7,307,667 | B1 | * | 12/2007 | Yeh et al. ....................... 348/555 |
| 7,453,492 | B2 | * | 11/2008 | Silverbrook ............... 348/207.2 |
| 2002/0018600 | A1 | * | 2/2002 | Lyon et al. ..................... 382/305 |
| 2003/0058346 | A1 | * | 3/2003 | Bechtel et al. ........... 348/207.99 |
| 2005/0062860 | A1 | * | 3/2005 | Kuroiwa .................. 348/231.99 |

* cited by examiner

FOREIGN PATENT DOCUMENTS

| JP | 04-038794 | 2/1992 |
| JP | 08-221978 | 8/1996 |
| JP | 2000-180650 | 6/2000 |
| JP | 2000-311487 | 11/2000 |

OTHER PUBLICATIONS

Japanese Office Action dated Aug. 26, 2008 for Application No. 2004-255341.

*Primary Examiner* — Lin Ye
*Assistant Examiner* — Amy Hsu
(74) *Attorney, Agent, or Firm* — Dentons US LLP

(57) ABSTRACT

To reduce random noise caused by address setting in an apparatus that controls a read address of an image sensing device, without causing a significant increase in circuit complexity.

A ring shift register sets a low-order address value depending on a value in steps of which an overall address value is incremented, and a Gray code counter sets a high-order address value. In the ring shift register, a carry from the lowest-order bit to the highest-order bit does not occur, and thus use of the ring shift register makes it possible to reduce the maximum number of toggled bits. The Gray code counter does not need to include a complicated circuit for switching the value in steps of which to increment the high-order address value. Thus, an overall address setting unit can be configured in a simple form without needing any complicated circuit such that addressing can be performed while maintaining the number of toggled bits within a small range and thus random noise generated in the addressing operation can be minimized.

19 Claims, 24 Drawing Sheets

FIG. 4

| ADDRESS VALUE 1 | | | | | | | | | | | | | | | | |
|---|---|---|---|---|---|---|---|---|---|---|---|---|---|---|---|---|
| | 46 | 47 | 48 | 49 | 50 | 51 | 52 | 53 | 54 | 55 | 56 | 57 | 58 | 59 | 60 | 61 |
| ACCESS ORDER 1 | 16 | 17 | 18 | | | | | | | 19 | | | 20 | | | 21 |

CONVENTIONAL TECHNIQUE

| BINARY CODE 00000 | GRAY CODE 0000 | NUMBER OF TOGGLED BITS |
|---|---|---|
| 101110 | 111001 | 1 |
| 110001 | 101001 | 3 |
| 110100 | 101110 | 1 |
| 110111 | 101100 | 3 |
| 111010 | 100111 | 1 |
| 111101 | 100011 | |

NUMBER OF TOGGLED BITS: 5, 2, 2, 3, 3

FIRST EMBODIMENT

| ADDRESS VALUE | HIGH-ORDER BITS (GRAY CODE COUNTER) 0000 | NUMBER OF TOGGLED BITS | LOW-ORDER BITS (RING SHIFT REGISTER) 000000000000001 | NUMBER OF TOGGLED BITS | TOTAL NUMBER OF TOGGLED BITS |
|---|---|---|---|---|---|
| 46 | 0010 | 0 | 0000000000000001 | 2 | 2 |
| 49 | 0010 | 0 | 0000000000001000 | 2 | 2 |
| 52 | 0010 | 0 | 0000000001000000 | 2 | 2 |
| 55 | 0010 | 1 | 0000001000000000 | 2 | 2 |
| 58 | 0010 | | 0010000000000000 | 2 | 3 |
| 61 | 0110 | | 0000000000000001 | | |

FIG. 5

ADDRESS VALUE 1 … 31 32 33 34 35 36 37 38 39 40 41 42 43 44 45 46

ACCESS ORDER 1 … 7 8 9 10

| ADDRESS VALUE | HIGH-ORDER BITS (GRAY CODE COUNTER) 0000 | NUMBER OF TOGGLED BITS | LOW-ORDER BITS (RING SHIFT REGISTER) 00000000000000001 | NUMBER OF TOGGLED BITS | TOTAL NUMBER OF TOGGLED BITS |
|---|---|---|---|---|---|
| 1 | 0011 | | 00000000000000001 | | |
| | | 0 | | 2 | 2 |
| | 0011 | | 0000000000100000 | | |
| | | 0 | | 2 | 2 |
| | 0011 | | 0000100000000000 | | |
| | | 1 | | 2 | 3 |
| | 0010 | | 00000000000000001 | | |
| | | 0 | | 2 | 2 |
| | 0010 | | 0000000000100000 | | |
| | | 0 | | 2 | 2 |
| | 0010 | | 0000100000000000 | | |

FIRST EMBODIMENT

| BINARY CODE 00000 | NUMBER OF TOGGLED BITS | GRAY CODE 0000 | NUMBER OF TOGGLED BITS | | |
|---|---|---|---|---|---|
| 011111 | | 010000 | | | 31 |
| | 5 | | 3 | | |
| 100100 | | 110110 | | | 36 |
| | 3 | | 3 | | |
| 101001 | | 111101 | | | 41 |
| | 3 | | 1 | | |
| 101110 | | 111001 | | | 46 |
| | 4 | | 3 | | |
| 110011 | | 101010 | | | 51 |
| | 3 | | 3 | | |
| 111000 | | 100100 | | | 56 |

CONVENTIONAL TECHNIQUE

FIG. 10

ADDRESS VALUE 1    41 42 43 44 45 46 47 48 49 50 51 52 53 54 55 56 57 58 59 60 61

ACCESS ORDER 1    10    11    12    13    14

| BINARY<br>CODE | GRAY<br>CODE | NUMBER OF<br>TOGGLED BITS | ADDRESS<br>VALUE 1 | HIGH-ORDER BITS<br>(GRAY CODE COUNTER)<br>0000 | LOW-ORDER BITS<br>(RING SHIFT REGISTER)<br>00000000000000000001 | NUMBER OF<br>TOGGLED BITS | NUMBER OF<br>TOGGLED BITS | TOTAL NUMBER OF<br>TOGGLED BITS |
|---|---|---|---|---|---|---|---|---|
| 00000 | 0000 | | | | | | | |
| 101001 | 111101 | 1 | 41 | 0011 | 00000000000000000001 | 0 | 2 | 2 |
| 101101 | 111011 | 3 | 46 | 0011 | 00000000000000100000 | 0 | 2 | 2 |
| 110001 | 101001 | 1 | 51 | 0011 | 00000000010000000000 | 0 | 2 | 2 |
| 110101 | 101111 | 2 | 56 | 0011 | 00001000000000000000 | 1 | 2 | 3 |
| 111001 | 100101 | 1 | 61 | 0010 | 00000000000000000001 | 0 | 2 | 2 |
| 111101 | 100011 | 2 | 66 | 0010 | 00000000000000100000 | | | |

CONVENTIONAL TECHNIQUE

SECOND EMBODIMENT

FIG. 13

| | | | | | | | | | | | | | | | | |
|---|---|---|---|---|---|---|---|---|---|---|---|---|---|---|---|---|
| ADDRESS VALUE | 1 | ... | 46 | 47 | 48 | 49 | 50 | 51 | 52 | 53 | 54 | 55 | 56 | 57 | 58 | 59 | 60 | 61 |
| ACCESS ORDER | 1 | | 16 | | | 17 | | | 18 | | | 19 | | | 20 | | | 21 |

CONVENTIONAL TECHNIQUE

| BINARY CODE 00000 | NUMBER OF TOGGLED BITS | GRAY CODE 0000 | NUMBER OF TOGGLED BITS | ADDRESS VALUE 1 |
|---|---|---|---|---|
| 101110 | 5 | 111001 | 1 | 46 |
| 110001 | 2 | 101001 | 3 | 49 |
| 110100 | 2 | 101110 | 1 | 52 |
| 110111 | 3 | 101100 | 3 | 55 |
| 111010 | 3 | 100111 | 1 | 58 |
| 111101 | | 100011 | | 61 |

THIRD EMBODIMENT

| HIGH-ORDER BITS (BINARY COUNTER) 0000 | NUMBER OF TOGGLED BITS | LOW-ORDER BITS (RING SHIFT REGISTER) 00000000000000001 | NUMBER OF TOGGLED BITS | TOTAL NUMBER OF TOGGLED BITS |
|---|---|---|---|---|
| 0011 | 0 | 0000000000000001 | 2 | 2 |
| 0011 | 0 | 0000000000001000 | 2 | 2 |
| 0011 | 0 | 0000000001000000 | 2 | 2 |
| 0011 | 0 | 0000001000000000 | 2 | 2 |
| 0011 | 3 | 0010000000000000 | 2 | 5 |
| 0100 | | 0000000000000001 | | |

FIG. 14

ADDRESS VALUE 1: 31 32 33 34 35 36 37 38 39 40 41 42 43 44 45 46

ACCESS ORDER 1: 7 8 9 10

CONVENTIONAL TECHNIQUE

| BINARY CODE | NUMBER OF TOGGLED BITS | GRAY CODE | NUMBER OF TOGGLED BITS |
|---|---|---|---|
| 00000 | | 0000 | |
| 011111 | 5 | 010000 | 1 |
| 100100 | 3 | 110110 | 3 |
| 101001 | 3 | 111101 | 1 |
| 101110 | 4 | 111001 | 3 |
| 110011 | 3 | 101010 | 3 |
| 111000 | | 100100 | |

THIRD EMBODIMENT

| ADDRESS VALUE | HIGH-ORDER BITS (BINARY COUNTER) | NUMBER OF TOGGLED BITS | LOW-ORDER BITS (RING SHIFT REGISTER) | NUMBER OF TOGGLED BITS | TOTAL NUMBER OF TOGGLED BITS |
|---|---|---|---|---|---|
| 1 | 0000 | | 00000000000000001 | | |
| 31 | 0010 | 0 | 00000000000000001 | 2 | 2 |
| 36 | 0010 | 0 | 00000000100000000 | 2 | 2 |
| 41 | 0010 | 1 | 00001000000000000 | 2 | 3 |
| 46 | 0011 | 0 | 00000000000000001 | 2 | 2 |
| 51 | 0011 | 0 | 00000000100000000 | 2 | 2 |
| 56 | 0011 | | 00001000000000000 | | |

FIG. 17

ADDRESS VALUE 1 … 46 47 48 49 50 51 52 53 54 55 56 57 58 59 60 61

ACCESS ORDER 1 16 17 18 19 20 21

CONVENTIONAL TECHNIQUE

| BINARY CODE 00000 | NUMBER OF TOGGLED BITS | GRAY CODE 0000 | NUMBER OF TOGGLED BITS |
|---|---|---|---|
| 101110 | | 111001 | |
| | 5 | | 1 |
| 110001 | | 101001 | |
| | 2 | | 3 |
| 110100 | | 101110 | |
| | 2 | | 1 |
| 110111 | | 101100 | |
| | 3 | | 3 |
| 111010 | | 100111 | |
| | 3 | | 1 |
| 111101 | | 100011 | |

FOURTH EMBODIMENT

ADDRESS VALUE 1

| HIGH-ORDER BITS (GRAY CODE COUNTER) 0000 | NUMBER OF TOGGLED BITS | LOW-ORDER BITS (JOHNSON COUNTER) 00000001 | NUMBER OF TOGGLED BITS | TOTAL NUMBER OF TOGGLED BITS |
|---|---|---|---|---|
| | | 00000001 | | |
| 0010 | 0 | | 3 | 3 |
| | | 00001111 | | |
| 0010 | 0 | | 3 | 3 |
| | | 01111111 | | |
| 0010 | 0 | | 3 | 3 |
| | | 11111111 | | |
| 0010 | 0 | | 3 | 3 |
| | | 11100000 | | |
| 0010 | 1 | | 4 | 5 |
| | | 00000001 | | |
| 0110 | | | | |

FIG. 18

ADDRESS VALUE 1: 31 32 33 34 35 36 37 38 39 40 41 42 43 44 45 46

ACCESS ORDER 1: 7 8 9 10

CONVENTIONAL TECHNIQUE

| BINARY CODE | NUMBER OF TOGGLED BITS | GRAY CODE | NUMBER OF TOGGLED BITS |
|---|---|---|---|
| 00000 | | 0000 | |
| 011111 | 5 | 010000 | 3 |
| 100100 | 3 | 110110 | 3 |
| 101001 | 3 | 111101 | 1 |
| 101110 | 4 | 111001 | 3 |
| 110011 | 3 | 101010 | 3 |
| 111000 | | 100100 | |

FOURTH EMBODIMENT

| ADDRESS VALUE | HIGH-ORDER BITS (GRAY CODE COUNTER) | NUMBER OF TOGGLED BITS | LOW-ORDER BITS (JOHNSON COUNTER) | NUMBER OF TOGGLED BITS | TOTAL NUMBER OF TOGGLED BITS |
|---|---|---|---|---|---|
| 1 | 0000 | | 000000000000001 | | |
| 31 | 0011 | 0 | 000000001 | 5 | 5 |
| 36 | 0011 | 0 | 00111111 | 5 | 5 |
| 41 | 0011 | 1 | 11111000 | 6 | 7 |
| 46 | 0010 | 0 | 00000001 | 5 | 5 |
| 51 | 0010 | 0 | 00111111 | 5 | 5 |
| 56 | 0010 | | 11111000 | | |

FIG. 21

ADDRESS VALUE 1 ... 16 17 18 19 20 21
ACCESS ORDER 1 ... 46 47 48 49 50 51 52 53 54 55 56 57 58 59 60 61

CONVENTIONAL TECHNIQUE

| BINARY CODE 00000 | NUMBER OF TOGGLED BITS | GRAY CODE 0000 | NUMBER OF TOGGLED BITS | ADDRESS VALUE 1 |
|---|---|---|---|---|
| 101110 | 5 | 111001 | 1 | 46 |
| 110001 | 2 | 101001 | 3 | 49 |
| 110100 | 2 | 101110 | 1 | 52 |
| 110111 | 3 | 101100 | 3 | 55 |
| 111010 | 3 | 100111 | 1 | 58 |
| 111101 |   | 100011 |   | 61 |

FIFTH EMBODIMENT

| HIGH-ORDER BITS BINARY COUNTER 0000 | NUMBER OF TOGGLED BITS | LOW-ORDER BITS JOHNSON COUNTER 00000001 | NUMBER OF TOGGLED BITS | TOTAL NUMBER OF TOGGLED BITS |
|---|---|---|---|---|
| 0011 | 0 | 00000001 | 3 | 3 |
| 0011 | 0 | 00001111 | 3 | 3 |
| 0011 | 0 | 01111111 | 3 | 3 |
| 0011 | 0 | 11111100 | 3 | 3 |
| 0011 | 3 | 11100000 | 4 | 7 |
| 0100 |   | 00000001 |   |   |

FIG. 22

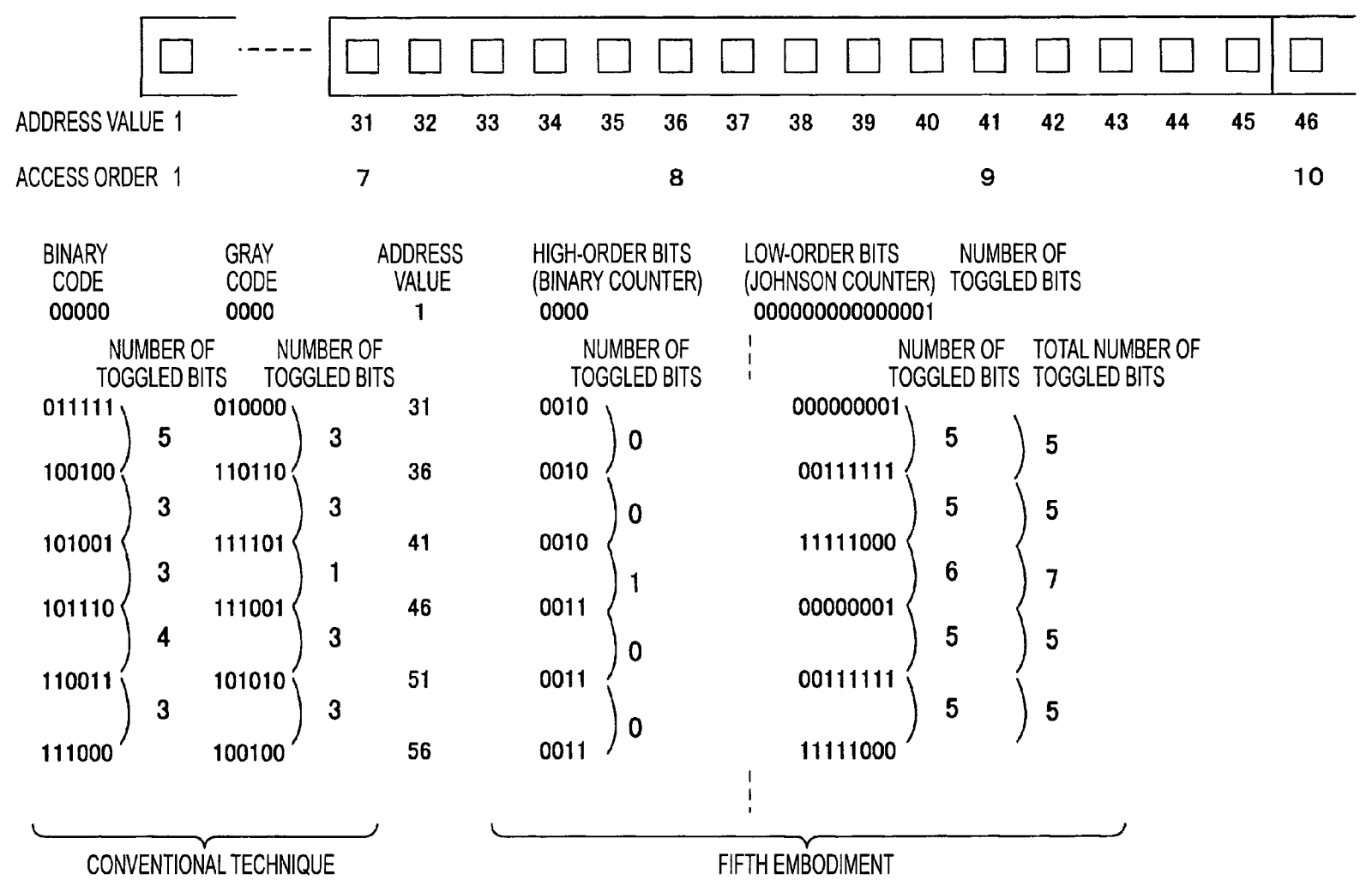

| | | | | | | | | | | | | | | | | |
|---|---|---|---|---|---|---|---|---|---|---|---|---|---|---|---|---|
| □ | ... | □ | □ | □ | □ | □ | □ | □ | □ | □ | □ | □ | □ | □ | □ | □ |
| | | 31 | 32 | 33 | 34 | 35 | 36 | 37 | 38 | 39 | 40 | 41 | 42 | 43 | 44 | 45 | 46 |

ADDRESS VALUE 1

ACCESS ORDER 1   7   8   9   10

CONVENTIONAL TECHNIQUE

| BINARY CODE 00000 | NUMBER OF TOGGLED BITS | GRAY CODE 0000 | NUMBER OF TOGGLED BITS | ADDRESS VALUE 1 |
|---|---|---|---|---|
| 011111 | 5 | 010000 | | 31 |
| 100100 | 3 | 110110 | 3 | 36 |
| 101001 | 3 | 111101 | 3 | 41 |
| 101110 | 4 | 111001 | 1 | 46 |
| 110011 | 3 | 101010 | 3 | 51 |
| 111000 | 3 | 100100 | 3 | 56 |

FIFTH EMBODIMENT

| HIGH-ORDER BITS (BINARY COUNTER) 0000 | NUMBER OF TOGGLED BITS | LOW-ORDER BITS (JOHNSON COUNTER) 000000000000001 | NUMBER OF TOGGLED BITS | TOTAL NUMBER OF TOGGLED BITS |
|---|---|---|---|---|
| 0010 | 0 | 000000001 | 5 | 5 |
| 0010 | 0 | 00111111 | 5 | 5 |
| 0010 | 1 | 11111000 | 6 | 7 |
| 0011 | 0 | 00000001 | 5 | 5 |
| 0011 | 0 | 00111111 | 5 | 5 |
| 0011 | 0 | 11111000 | 5 | 5 |

METHOD OF CONTROLLING READ ADDRESS, PHYSICAL INFORMATION ACQUISITION APPARATUS, AND SEMICONDUCTOR DEVICE

CROSS PREFERENCE TO RELATED APPLICATIONS

The present invention claims the benefit of Japanese Patent Application JP 2004-255341 filed in the Japanese Patent Office on Sep. 2, 2004, the entire contents of which are incorporated herein by reference.

FIELD OF THE INVENTION

The present invention relates to a method of controlling a read address, and also outputs a physical information acquisition apparatus, and a semiconductor device for detecting a physical quantity distribution. More particularly, the present invention relates to control an address value in reading unit-element signals from unit elements, particularly suitable for use in a semiconductor device for detecting a physical quantity distribution, such as a solid-state image sensor including an array of unit elements sensitive to an electromagnetic wave such as light or radiation incident from the outside and capable of outputting an electrical signal indicating a physical quantity distribution detected by the unit elements. More specifically, the present invention relates to a technique of controlling addressing in a timing generator for controlling reading of a signal from an image sensing device or in an image sensing apparatus including a timing generator and an image sensing device.

BACKGROUND OF THE INVENTION

In various applications, to detect a physical quantity distribution, a semiconductor device is widely used which includes a linear array or a matrix array of unit elements (pixels) sensitive to a change in a physical quantity such as a pressure or an electromagnetic wave such as light or radiation incident from the outside.

For example, as shown in FIG. 2B, in video devices, a solid-state image sensor is used which includes an image sensor device (image sensing device) of a CCD (Charge Coupled Device) type, a MOS (Metal Oxide Semiconductor) type, or a CMOS (Complementary Metal-Oxide Semiconductor) type to detect a change in a physical quantity such as light (which is an example of an electromagnetic wave).

In computer devices, a fingerprint recognition device is used to acquire fingerprint information by detecting an image of a fingerprint based on a change in an electrical or optical characteristic associated with a pressure. In these apparatus, a physical quantity distribution is converted into an electrical signal by unit elements (pixels in the case of a solid-state image sensor) and the resultant electrical signal is read out.

In some solid-state image sensors, an active pixel sensor (APS) is used in which a driving transistor for amplification is disposed in each image signal generation part that generates an image signal corresponding to a signal charge generated in a charge generation part. This structure is used in many CMOS solid-state image sensors.

In such an active solid-state image sensing apparatus, to read an image signal, unit pixels arranged in a pixel array part are sequentially selected by controlling addressing, and signals are read from the respective unit pixels. That is, the active solid-state image sensing apparatus is a solid-state image sensor of the address control type.

For example, in an active pixel sensor of the X-Y addressing type in which unit pixels are arranged in the form of a matrix array, each pixel is configured to have an amplification capability using an active element having a MOS structure (MOS transistor). In this structure, a signal charge (photoelectrons) accumulated in a photodiode serving as a photoelectric conversion device is amplified by the active element and read out as image information.

In the X-Y addressing solid-state image sensing device of this type, for example, a pixel array part is formed using a large number of pixel transistors arranged in the form of a two-dimensional matrix array. Accumulation of signal charges corresponding to incident light is started on a line-by-line (row-by-row) basis or a pixel-by-pixel basis, and a current or a voltage corresponding to the signal charge accumulated in each pixel is read sequentially from the respective pixels by accessing the pixels by means of addressing.

In solid-state image sensing devices of the MOS type (and of the CMOS type), the addressing is performed, for example, such that pixels are simultaneously accessed on a line-by-line basis and pixel signals are read from the accessed pixels, that is, pixel signals are read on a line-by-line basis from a pixel array part. In some solid-state image sensing devices of this type, to adapt to the reading scheme of accessing the pixel array part on a line-by-line basis and reading pixels signals from the accessed line, analog-to-digital converters and/or other signal processing units are disposed for respective vertical columns. This configuration is called a column parallel arrangement. Of solid-state image sensing devices with a column-parallel arrangement, a solid-state image sensing device in which a CDS processor or a digital converter is disposed in each vertical column such that pixel signals are sequentially read and output is called a column-type solid-state image sensing device.

As a result of reductions in size and cost of solid-state image sensing devices such as CCD or CMOS image sensors, various kinds of video devices using a solid-state image sensing device, such as a digital still camera for taking a still image, a portable telephone with a camera, and a video camera for taking a motion image, have come to be widely used. CMOS image sensors can operate with less consumption power and can be produced at a lower cost than CCD image sensors, and thus CMOS image sensors are expected to be widely used instead of CCD image sensors.

For example, in CMOS image sensors, electrons generated as a result of a photoelectric conversion are accumulated in each pixel, and pixel signals are sequentially read from pixels in pixel columns (vertical columns) specified by address control signals output from a sensor control unit (SCU).

More specifically, an address setting circuit is disposed in a vertical scanning circuit located close to the pixel array part, and an address control signal is supplied from the address setting circuit to sequentially select pixels. In accordance with the address control signal, the vertical scanning circuit supplies various kinds of control signals (generically referred to as control signals) to the respective pixels via driving buffers thereby turning on/off the pixel transistor at the specified horizontal address position. Thus, the address decoder generates data indicating the address of a pixel to be selected.

The solid-state image sensing device of the X-Y addressing type is capable of reading a signal from an arbitrary pixel at a specified address, that is, the solid-state image sensing device of this type has a random access capability. Unlike the CCD (Charge Coupled Device) image sensor that reads signal charges from pixels while sequentially selecting pixels using a shift register, the solid-state image sensing device of the X-Y addressing type is capable of arbitrarily setting the order in which to read signals from pixels.

When pixel signals are read from all pixels, the address setting circuit may be formed using counter circuits (hereinafter, also referred to as address counters). In this case, a vertical address counter and a horizontal address counter are sequentially incremented by "1" to scan all pixels. However, in some cases, it is not necessary to output pixel signals from all pixels.

For example, in the technique of taking a still image using a digital still camera or the like, it is known to use a CMOS-type solid-state image sensing device with a great number of pixels to obtain a high-resolution still image. In an "all-pixel read mode", which is a mode to obtain a high-resolution still image, pixel information is read independently from all pixels. However, when there are a great number of pixels, if pixel information is read from all pixels, it is difficult to achieve a sufficiently high frame rate in displaying a motion image on a monitor screen.

To avoid the above problem, it is known to provide other modes in addition to the "all-pixel read mode". More specifically, in a "decimation read mode", pixel information is read while skipping a particular number of rows or columns. In an "addition read mode", a particular number of rows or columns (pixels are not necessarily adjacent) are selected, and the sum of pixel information is output. In these modes, as a result of decimation or addition, the number of output pixels is reduced, and thus it is possible to increase the frame rate.

The decimation read mode is used to display an image with low resolution (corresponding to the number of a liquid crystal monitor) of a subject on the liquid crystal monitor to check the image of the subject. The decimation read mode is also used when a data size of a motion image is reduced by decimating pixel information, and the resultant motion image data is transmitted. The addition read mode is used not only to increase the frame rate by reducing the number of pixels of an output image but also to expand the dynamic range by adding pixel signals of a plurality of rows (for example, two rows).

In CCD-type image sensors, it is also possible to provide the decimation read mode or the addition read mode. However, because of its structure, the CCD-type image sensor can only read signal charges from pixels while sequentially selecting pixels using a shift register. Therefore, pixel information is first read from all pixels, and then the pixel information is decimated or added by an external signal processing circuit. In contrast, in X-Y addressing image sensors, decimation and addition of image information can be performed on an image sensing part, and an external signal processing circuit for this purpose is not necessary.

To freely select an order in which to read pixel information from pixels, a particular control mechanism to specify addresses is necessary depending on each mode.

For example, to decimate image information by a factor of 2 in both vertical and horizontal directions, the address counter is increased in steps of 2. That is, it is needed to change the steps in which to increase the address counter, depending on the mode.

Typically, address values are represented using a binary code or a Gray code.

When address values are represented in binary code, it is possible to easily realize a circuit for adding an address value with an arbitrary value, and thus it is possible to easily change the steps in which to increase the address value.

However, it is known that noise is generated when the data value inverts, and the noise can propagate via a power supply line or space. That is, the address counter can be a source of noise, whose state randomly changes because the number of inverting bits in data (hereinafter referred to as the number of toggled bits) changes randomly. If noise is generated in a constant state, it may be possible to deal with the generated noise. However, when the number of toggled bits randomly changes, it is difficult to deal with noise.

When the value changed from "0" to "1", only one bit is toggled. This is the smallest case in terms of the number of toggled bits. On the other hand, when a carry occurs from a lowest-order bit to a highest-order bit, all bits are toggled. This is the greatest case in terms of the number of toggled bits.

Because power source noise of the address counter varies depending on the randomly varying number of toggled bits as described above, the power source noise has a bad influence on an image.

FIGS. 23 and 24 show examples of relationships among accessed pixels, the address value, and the number of toggled bits for a case in which the binary code or the Gary code is used. More specifically, FIG. 23 shows an example of a manner in which the address value is increased in steps of 3, and FIG. 24 shows an example of a manner in which the address value is increased in steps of 5.

In both examples shown in FIGS. 23 and 24, the number of toggled bits of the binary code changes in a great range of 2 to 4.

One technique of reducing the number of toggled bits is to use Gray code. In the Gray code, when the address value is increased in steps of 1, a change occurs only in one bit. That is, the Gray code provides the least number of toggled bits and thus provides least noise.

However, even when the Gray code is used to express the address value, if the address value is increased in steps other than "1" as in the examples shown in FIGS. 23 and 24, the number of toggled bits also varies in a range of 1 to 3.

Another problem with the Gray code is that, unlike the binary code, it is difficult to realize a simple circuit capable of increasing the address value in various specified steps, but a complicated circuit is needed. The complexity of the circuit causes an increase in noise.

As described above, in the technique of increasing the address value using the counter based on the binary code or the Gray code, it is difficult to perform addressing in various modes needed, for example, in decimation while maintaining the change in the number of toggled bits within a small range which would make it easy to handle a problem associated with noise arising from the change in the number of toggled bits.

The above-described problem can occur not only in systems using an image sensing device but also in semiconductor systems using a semiconductor device such as a semiconductor memory in which the manner of addressing in the reading operation is allowed to be changed to a certain extent.

In view of the above, it is an object of the present invention to provide a technique of switching the manner of addressing as required depending on the reading mode, while maintaining the change in the number of toggled bits within a small range without needing a complicated circuit for addressing.

SUMMARY OF THE INVENTION

The present invention provides a method of controlling a read address, in a semiconductor device including a plurality of unit elements arranged in the form of a one-dimensional or two-dimensional array, so as to specify an address value of a unit element from which to read a signal, wherein the address value is divided into a high-order address value and a low-order address value, and the high-order address value and the low-order address value are set by address setting units that operate differently from each other.

The present invention provides a physical information acquisition apparatus and a semiconductor device advantageously using the method of controlling a read address, wherein the physical information acquisition apparatus or the semiconductor device includes a low-order address value setting unit for setting a low-order address value of an address value indicating a location of one of unit elements from which to read a signal, and a high-order address value setting unit for setting a high-order address value of the address value indicating the location of the one of unit elements from which to read the signal, wherein the high-order address value setting unit sets the high-order address value in a manner different from the manner in which the low-order address value setting unit sets the low-order address value.

BRIEF DESCRIPTION OF THE DRAWINGS

FIG. 4 is a diagram showing the relationship among accessed pixels, address values, and the number of toggled bits in a case in which the address value is incremented in steps of "3" according to the first embodiment of the invention.

FIG. 5 is a diagram showing the relationship among accessed pixels, address values, and the number of toggled bits in a case in which the address value is incremented in steps of "5" according to the first embodiment of the invention.

FIG. 10 is a diagram showing the relationship among accessed pixels, address values, and the number of toggled bits in a case in which the address value is incremented in steps of "5" according to the second embodiment of the invention.

FIG. 13 is a diagram showing the relationship among accessed pixels, address values, and the number of toggled bits in a case in which the address value is incremented in steps of "3" according to the third embodiment of the invention.

FIG. 14 is a diagram showing the relationship among accessed pixels, address values, and the number of toggled bits in a case in which the address value is incremented in steps of "5" according to the third embodiment of the invention.

FIG. 17 is a diagram showing the relationship among accessed pixels, address values, and the number of toggled bits in a case in which the address value is incremented in steps of "3" according to the fourth embodiment of the invention.

FIG. 18 is a diagram showing the relationship among accessed pixels, address values, and the number of toggled bits in a case in which the address value is incremented in steps of "5" according to the fourth embodiment of the invention.

FIG. 21 is a diagram showing the relationship among accessed pixels, address values, and the number of toggled bits in a case in which the address value is incremented in steps of "3" according to the fifth embodiment of the invention.

FIG. 22 is a diagram showing the relationship among accessed pixels, address values, and the number of toggled bits in a case in which the address value is incremented in steps of "5" according to the fifth embodiment of the invention.

DESCRIPTION OF THE PREFERRED EMBODIMENTS

The present invention is described in further detail below with reference to embodiments in conjunction with the accompanying drawings. In this embodiment described above, by way of example, a CMOS image sensor device whose pixels are all formed of NMOS or PMOS devices is used to construct a solid-state image sensor of the X-Y addressing type.

Note that the image sensor device is not limited to the MOS-type image sensor device, but the present embodiment and any other embodiment described later may be applied to any semiconductor device including a one-dimensional or two-dimensional array of elements sensitive to an electromagnetic wave incident from the outside, such as light or radiation, for detecting a physical quantity distribution.

Figure 1:
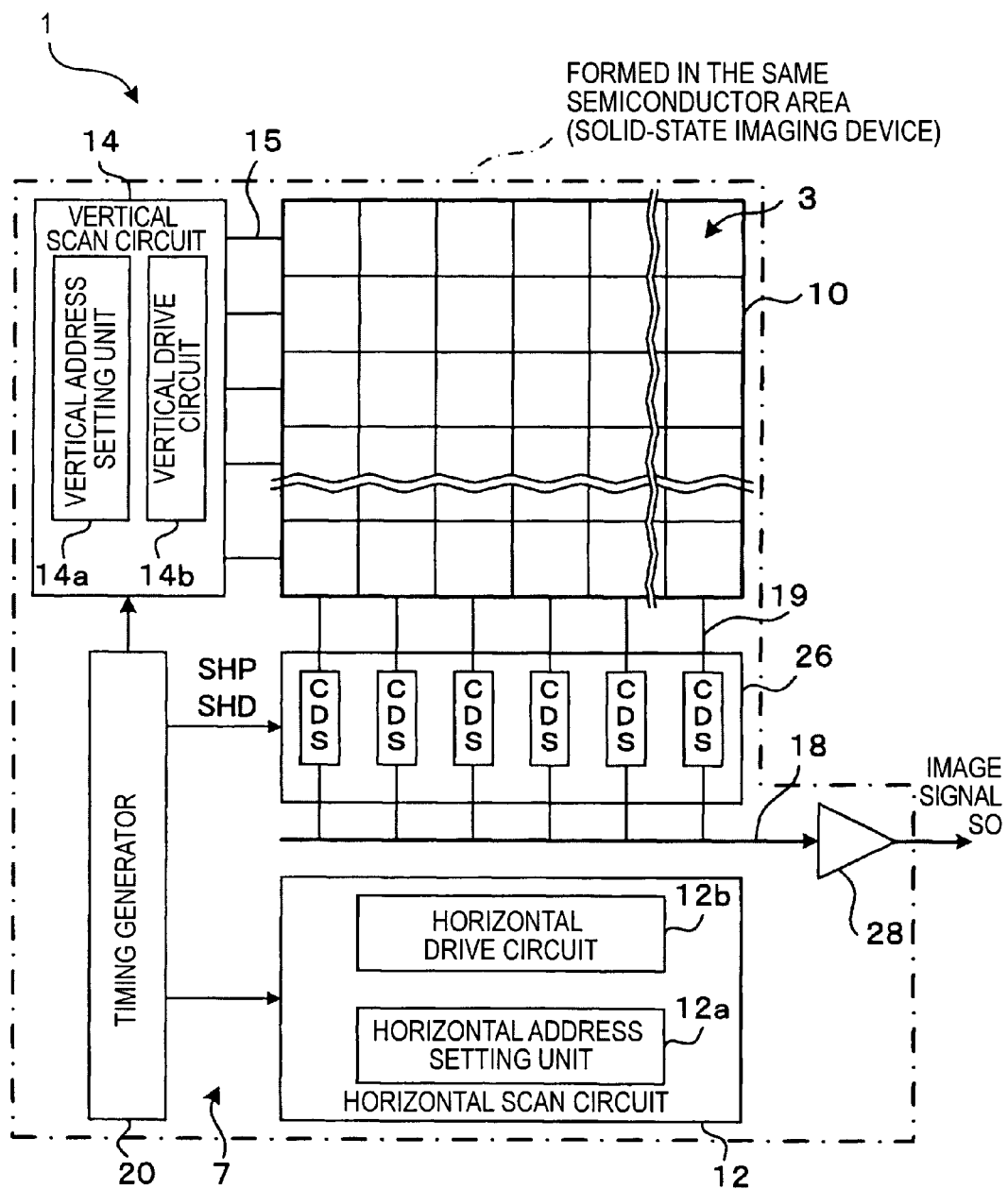
FIG. 1 is a block diagram showing a CMOS solid-state image sensor according to an embodiment of the present invention.

FIG. 1 shows a CMOS solid-state image sensor according to an embodiment of the present invention. This solid-state image sensor 1 is designed to function as an electronic still camera capable of taking a color image. Still image capture modes include not only a normal mode in which all pixels are sequentially read but also special modes in which pixel signals are read from pixels in an order different from that in which pixel signals are read in the normal mode. Examples of the special modes include a decimation read mode in which pixel signals are read while skipping a specified number of rows or columns, and an addition read mode in which a predetermined number of rows or columns are added together when pixel signals are read.

The solid-state image sensor 1 includes an image sensing part including a plurality of pixels each including a photosensor for outputting a voltage signal corresponding to the intensity of incident light, arranged along rows and columns (in the form of a two-dimensional array). The image sensing part is of the column type in which CDS (Correlated Double Sampling) blocks are disposed for respective vertical columns. More specifically, as shown in FIG. 1, the solid-state image sensor 1 includes an image sensing part (pixel array part) 10 including a plurality of unit pixels 3 (unit elements) arranged along rows and columns, a drive control unit 7 disposed outside the image sensing part 10, and a CDS unit (column circuit) 26. The drive control unit 7 includes, for example, a horizontal scanning circuit 12 and a vertical scanning circuit 14.

Although only some rows and columns are shown in FIG. 1 for the purpose of simplicity, an actual solid-state image sensor includes a greater number of rows and columns, and there are several ten to several thousand pixels in each row or column. In addition to the horizontal scanning circuit 12 and the vertical scanning circuit 14, the drive control unit 7 also includes a timing generator (which is an example of a read address controller) 20 for supplying timing pulse signals to the CDS unit 26. These parts of the drive control unit 7 are integrally formed together with the image sensing part 10 in a semiconductor region of single-crystal silicon or the like by using technology similar to semiconductor integrated circuit production technology, to obtain a solid-state image sensing device (image sensing device) which is an example of a semiconductor system.

The timing generator 20 may be formed on a semiconductor integrated circuit separate from the other functional parts such as the image sensing part 10 and the horizontal scanning circuit 12. In this case, the image sensing device including the image sensing part 10 and the horizontal scanning circuit 12 and the timing generator 20 form the image sensing apparatus serving as the semiconductor system. The image sensing apparatus may be in the form of an image sensor module including peripheral circuits such as a signal processor and a power supply circuit.

Each unit pixel 3 is connected to the vertical scanning circuit 14 via a vertical control line 15 for selecting a vertical column and to the CDS unit 26 via a vertical signal line 19. The horizontal scanning circuit 12 and the vertical scanning circuit 14 are each composed of a shift register such that a shifting operation (a scanning operation) starts in response to a driving pulse supplied from the timing generator 20. Thus, various pulse signals are transmitted over the vertical control lines 15 to drive the unit pixels 3.

The CDS units 26 serving as the column circuits are disposed for the respective columns so that one row of pixel signals is input to the CDS units 26 and processed by the CDS units 26. More specifically, in response to two sample pulses output from the timing generator 20, that is, a sample pulse SHP and a sample pulse SHD, the CDS units 26 subtract signal levels obtained immediately after the pixels are reset (the signal level in this state includes only a noise component) from the voltage pixel signals supplied via the vertical signal lines 19 thereby removing noise signal components such as fixed pattern noise (FPN) or reset noise from the voltage pixel signals.

At locations following the respective CDS units 26, AGC (Auto Gain Control) circuits or ADCs (Analog Digital Converters) may be formed as required in the same semiconductor region as that in which the CDS units 26 are formed.

The horizontal scanning circuit 12 includes a horizontal address setting unit 12a that specifies a horizontal line (by specifying a horizontal address) along which to read signals (by selecting respective column circuits in the CDS unit 26), and also includes a horizontal driving circuit 12b that transfers the respective signals from the CDS unit 26 to the horizontal signal line 18 in accordance with the read address specified by the horizontal address setting unit 12a.

The vertical scanning circuit 14 includes a vertical address setting unit 14a that specifies a vertical line (a row of the image sensing part 10) (by specifying a vertical address) along which to read signals, and also includes a vertical driving circuit 14b that supplies a pulse to a control line connected to unit pixels 3 located in the row corresponding to the read address specified by the vertical address setting unit 14a thereby driving the unit pixels 3. The vertical address setting unit 14a also serves to select a row in an electronic shuttering operation in addition to selection of a row in a signal reading operation.

The timing generator 20 supplies a horizontal address signal to the horizontal address setting unit 12a and a vertical address signal to the vertical address setting unit 14a. In accordance with the supplied horizontal or the vertical address signal, the address setting units 12a and 14a select a row or a column.

The resultant voltage signals output from the CDS units 26 are transmitted over the horizontal signal line 18 and supplied an output buffer 28 via a horizontal selection switch (not shown) driven by the horizontal selection signal supplied from the horizontal scanning circuit 12. The series of voltage signals is then output as an image signal S0 from the output buffer to an external circuit.

As described above, in the solid-state image sensor 1 of the column type, pixel signals (in the form of voltage) from the unit pixels 3 are output via the vertical signal lines 19, the CDS units 26, the horizontal signal line 18, and finally the output buffer 28. In the outputting of the pixel signals, pixel signals along one row are transmitted in parallel to the respective CDS units 26 via the corresponding vertical signal lines 19, and signals output from the CDS units 26 are serially output via the horizontal signal line 18. In the above operation, the selection of the row is performed via the vertical control lines 15.

Note that there is no particular restriction on the manner in which pulse signals are supplied to the unit pixels 3 in the row direction or the column direction, that is, there is no restriction on the physical arrangement of the driving clock lines along which pulse signals are supplied, as long as vertical columns and horizontal rows are correctly driven.

Figure 6:
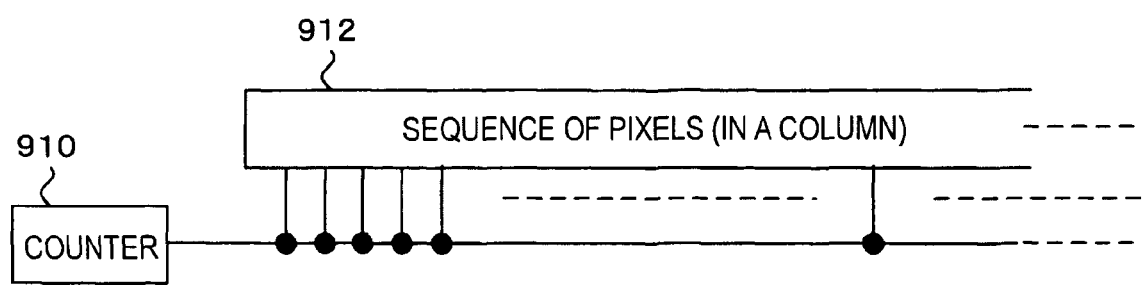
FIG. 6 is a block diagram showing a comparative example of a manner in which addressing is performed simply by using a single counter.
Figure 7:
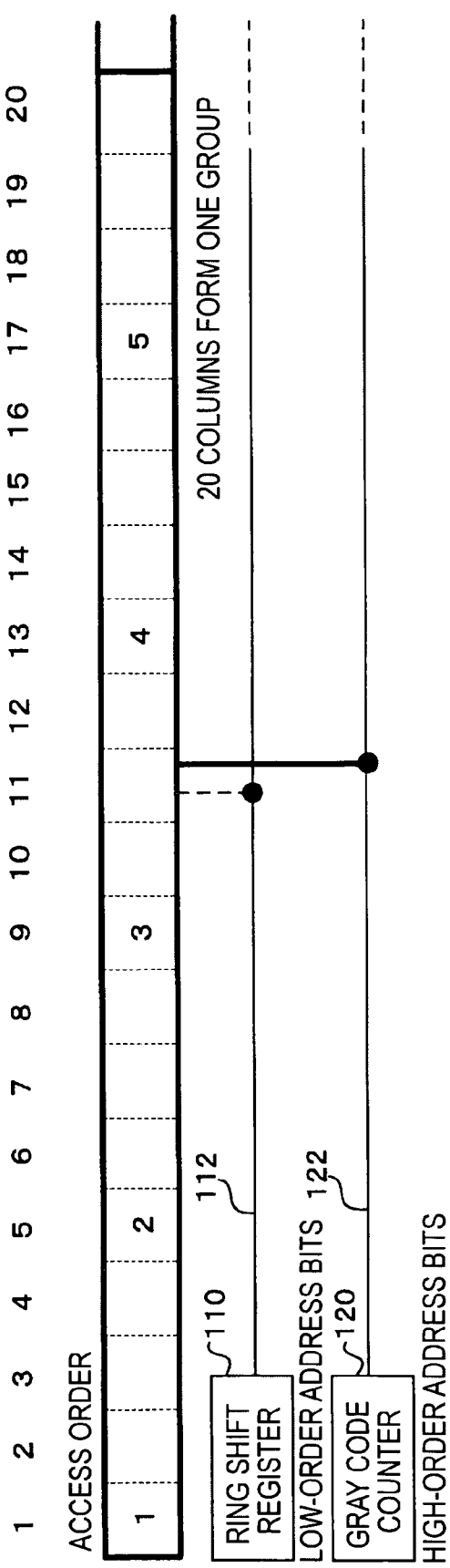
FIG. 7 is a diagram showing a manner in which addressing is performed such that an address value is incremented in steps of "4" according to a second embodiment of the invention.
Figure 8:
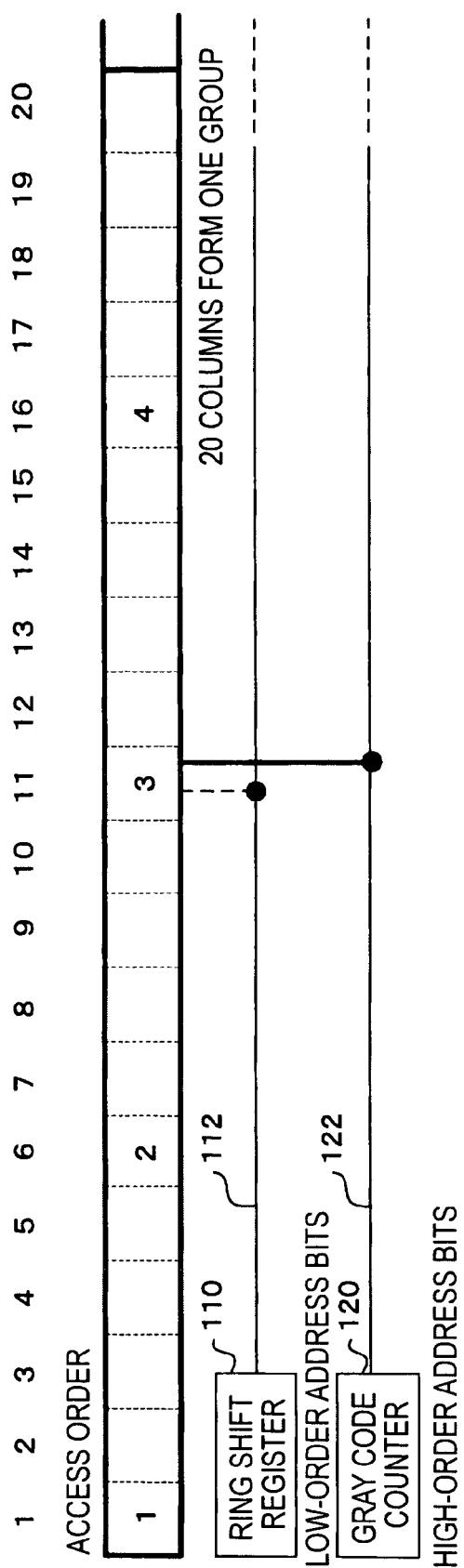
FIG. 8 is a diagram showing a manner in which addressing is performed such that an address value is incremented in steps of "5" according to the second embodiment of the invention.

FIGS. 2 to 5 show examples of addressing for the image sensing part 10 of the solid-state image sensor 1 shown in FIG. 1 in accordance with a first embodiment of the present invention. In the example shown in FIG. 2, the address value is increased in steps of "3". In the example shown in FIG. 3, the address value is increased in steps of "5". FIG. 4 shows the relationship among accessed pixels, address values, and the number of toggled bits in the case in which the address value is increased in steps of "3". FIG. 5 shows the relationship among accessed pixels, address values, and the number of toggled bits in the case in which the address value is increased in steps of "5". FIG. 6 shows a comparative example in which a single counter is used in a simple manner.

In the respective embodiments described below, although only an addressing process of selecting a column of pixels is described, addressing can be performed in a similar manner to select a row.

Figure 2:
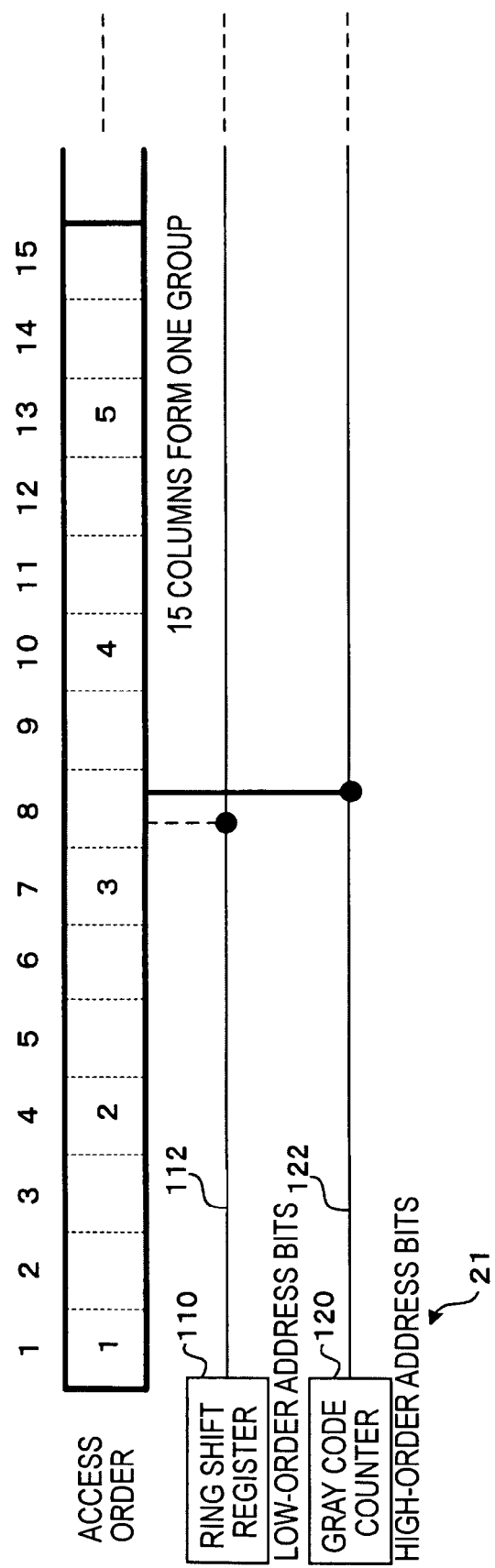
FIG. 2 is a diagram showing a manner in which addressing is performed such that an address value is incremented in steps of "3" according to a first embodiment of the invention.
Figure 3:
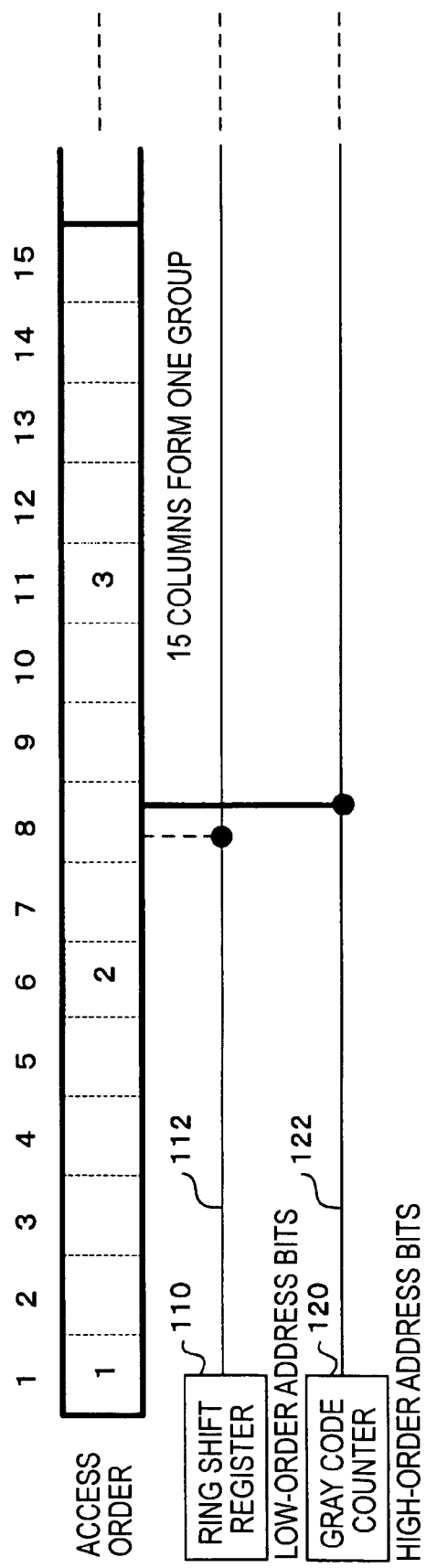
FIG. 3 is a diagram showing a manner in which addressing is performed such that an address value is incremented in steps of "5" according to the first embodiment of the invention.

As shown in FIGS. 2 and 3, the solid-state image sensor 1 includes an address setting part 21 for specifying an address at which to read a signal. The address setting part 21 includes an address counter, which is composed of not a conventional simple binary counter or Gray counter but a combination of different types of counters used for upper-order and low-order bits.

The low-order address value setting part has the capability of switching the value by which to increment the address value, but the high-order address value setting part does not need to have such a capability and the high-order address value setting part always increments the high-order address value by "1".

The address setting part 21 specifies a relative address value and is disposed, for example, in the timing generator 20. Converting of the relative address to an actual absolute address on the image sensing part 10 is performed by the horizontal address setting unit 12a or the vertical address setting unit 14a based on address information supplied from the address setting part. To setting the absolute address, the horizontal address setting unit 12a and the vertical address setting unit 14a may be formed in a manner similar to the manner in which the address setting part 21 is formed.

More specifically, the address setting part 21 in the timing generator 20 outputs a vertical address signal to the vertical address setting unit 14a, and the vertical address setting unit 14a selects a pixel column in accordance with the received vertical address signal thereby controlling the order in which to read pixel values from columns of the image sensing part 10. The column address signal generated by the address setting part 21 is varied depending on whether pixel signals are read in the decimation read mode, the addition read mode, or other modes.

In this first embodiment, the address counter serving as the address setting part 21 (or the horizontal scanning circuit 12 and the vertical address setting unit 14a) includes a ring shift register 110 serving as the low-order address value setting part and a Gray code counter 120 serving as the high-order address value setting part.

Although the details of the ring shift register 110 is not shown, the basic operation of the ring shift register 110 is to shift the data stored in the ring shift register 110 by one bit each time a shift pulse is given. In the present embodiment, the value by which to sift the data is varied depending on the value by which to increment the address value. The "ring" prior to the "shift register" is used to indicate that the value output from the final stage of the shift register is fed back to the first stage of the shift register.

In the ring shift register 110, unlike the binary counter, a carry from the lowest-order bit to the highest-order bit does not occur, and thus use of the ring shift register 110 makes it possible to reduce the maximum number of toggled bits. More specifically, when address data is shifted by a few bits, toggling occurs at some two bits. That is, the number of toggled bits is always two.

An address setting line 112 extends from the ring shift register 110, and an address setting line 122 extends from the Gray code counter 120 such that address signals are transmitted over the respective address setting lines 112 and 122.

The address setting part 21 is capable of operating not only in the normal mode in which the address value is incremented by "1" but also in other modes in which the address value is incremented by an arbitrary specified value.

For example, to make it possible to operate not only in the normal mode but also in a mode in which the address value is incremented by "3" and a mode in which the address value is incremented by "5", as many values as the least common multiple of "3" and "5", that is, "15" values (15 child values) are represented by the low-order bits of address value, and setting of the low-order bits of the address value is performed by the ring shift register 110. The value of high-order bits of the address value (which specifies a group (parent) to which 15 child values belong) is set by the Gray code counter 120. That is, each address is represented by a combination of low-order bits (a child value) dealt with by the ring shift register 110 and high-order bits (parent value) dealt with by the Gray code counter 120, and the overall address is set cooperatively by the ring shift register 110 and the Gray code counter 120.

For example, as shown in FIGS. 2 and 3, the child value (low-order bits) of the address value is set by the ring shift register 110, and the resultant value is transmitted over the address setting line 112 extending from the ring shift register 110 to specify a column.

On the other hand, the parent value (high-order bits) of the address value is set by the Gray code counter 120 and the resultant value is transmitted over the address line 122 extending from the Gray code counter 120 to specify a group.

In this address setting part 21 configured in the above-described manner, when the address value is incremented, for example, in steps of "3", the number of bits toggled in the ring shift register 110 is always equal to 2 as shown in FIG. 4, and toggling of one bit occurs in the Gray code counter 120 when the group is switched to a next group. Thus, the total number of toggled bits is equal to "2" or "3".

On the other hand, when the address value is incremented in steps of "5", the number of bits toggled in the ring shift register 110 is always equal to 2 as shown in FIG. 5, and toggling of one bit occurs in the Gray code counter 120 when the group is switched to a next group. Thus, also in this case, the total number of toggled bits is equal to "2" or "3".

In any case, the change in the number of toggled bits becomes smaller than that which occurs in a conventional address setting part using a binary code or a Gray code. For the purpose of comparison, an example of a conventional address setting part configured simply using a counter is shown in FIG. 6. In this configuration, an address setting line 912 extends in a horizontal direction from a counter 910, and an address signal generated by the counter 910 is transmitted over the address setting line 912 to specify a pixel column 920. When the address setting circuit is formed using only the counter 910 in the above-described manner, the number of toggled bits varies greatly depending on the address value as described earlier and this can cause random noise.

In contrast, in the configuration according to the first embodiment in which the address setting part 21 is formed using a combination of different types of address setting parts, that is, the ring shift register 110 and the Gray code counter 120, for dealing with low-order bits and high-order bits, the number of toggled bits does not change greatly regardless of the address value, and thus it is possible to prevent a significant problem due to random noise caused by toggling of bits that occurs when the address is set.

The ring shift register 110 for setting the low-order address value, which is allowed to be incremented in steps of a specified value, can be formed using a simple known counter circuit. On the other hand, it is sufficient for the Gray code counter 120 used to set the high-order address value to increment the high-order address value by "1", and the Gray code counter 120 does not need to have the capability of switching the value by which to increment the high-order address value. Thus, the Gray code counter 120 does not need to include a complicated circuit for switching the value by which to increment the high-order address value.

Thus, the address setting part 21 as a whole can be configured in a simple form without needing any complicated circuit such that addressing can be performed while maintaining the number of toggled bits within a small range and thus random noise generated in the addressing operation can be minimized.

Figure 9:
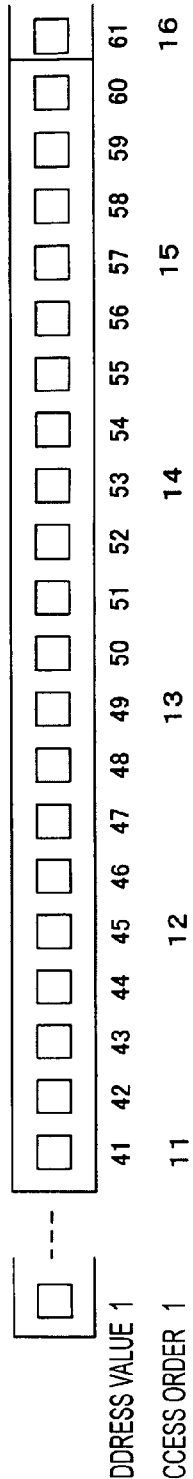
FIG. 9 is a diagram showing the relationship among accessed pixels, address values, and the number of toggled bits in a case in which the address value is incremented in steps of "4" according to the second embodiment of the invention.
Figure 11:
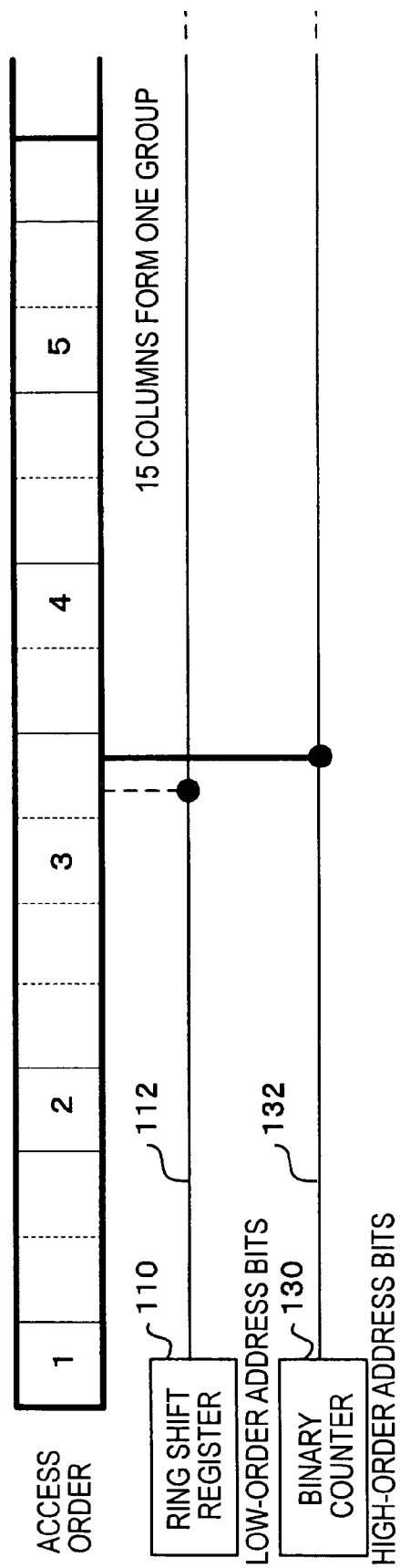
FIG. 11 is a diagram showing a manner in which addressing is performed such that an address value is incremented in steps of "3" according to a third embodiment of the invention.
Figure 12:
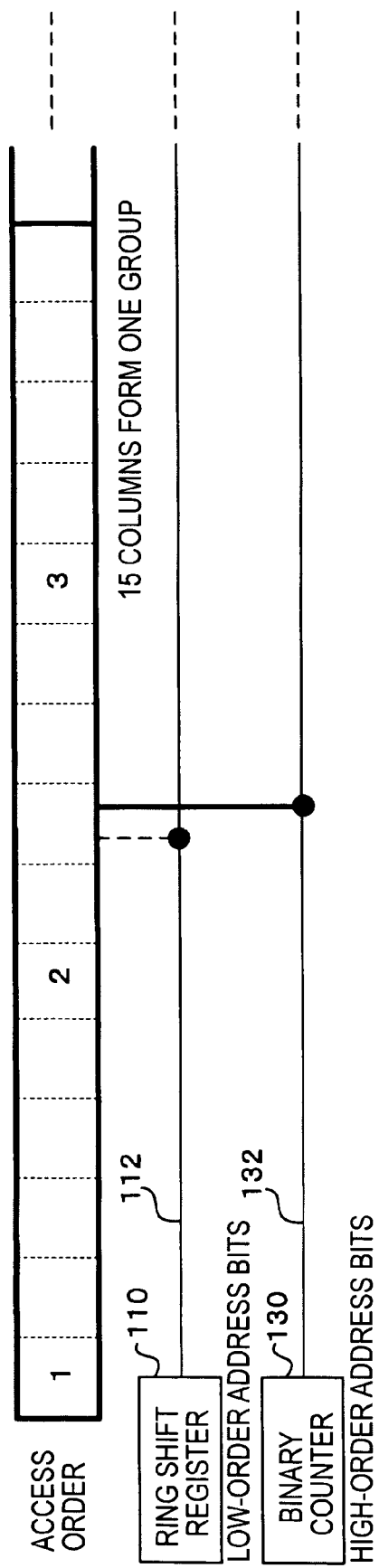
FIG. 12 is a diagram showing a manner in which addressing is performed such that an address value is incremented in steps of "5" according to the third embodiment of the invention.
Figure 15:
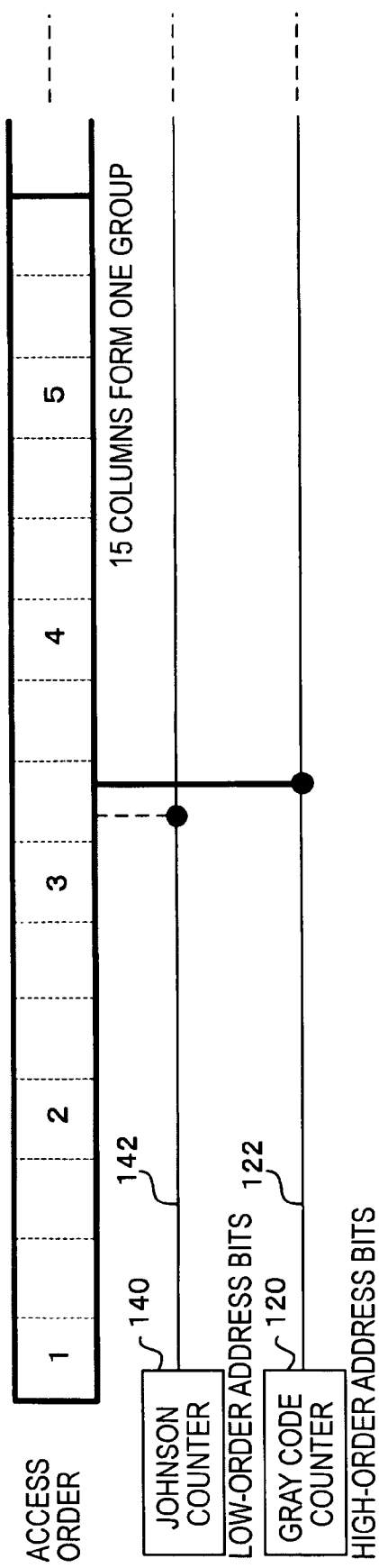
FIG. 15 is a diagram showing a manner in which addressing is performed such that an address value is incremented in steps of "3" according to a fourth embodiment of the invention.
Figure 16:
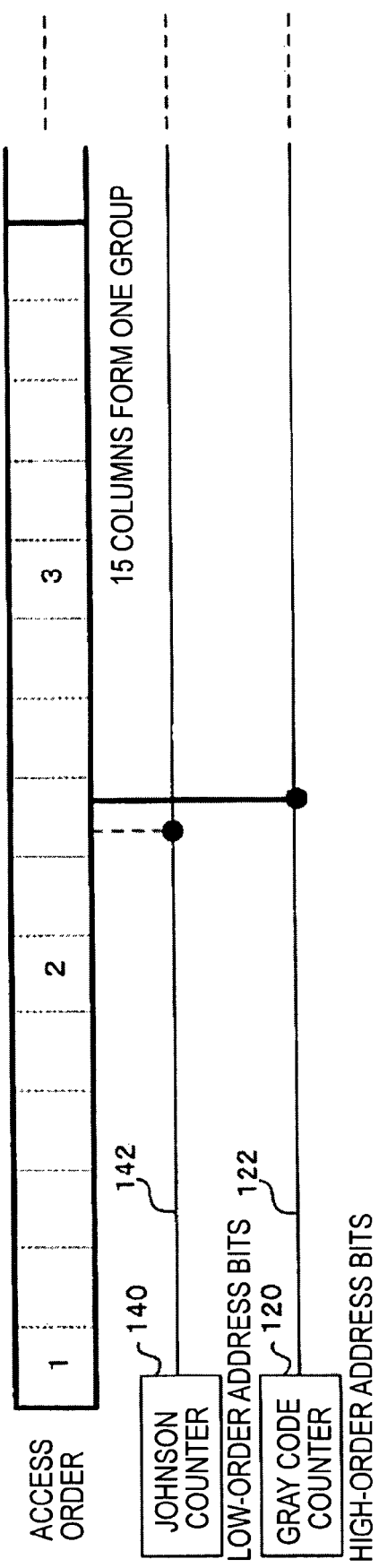
FIG. 16 is a diagram showing a manner in which addressing is performed such that an address value is incremented in steps of "5" according to the fourth embodiment of the invention.
Figure 19:
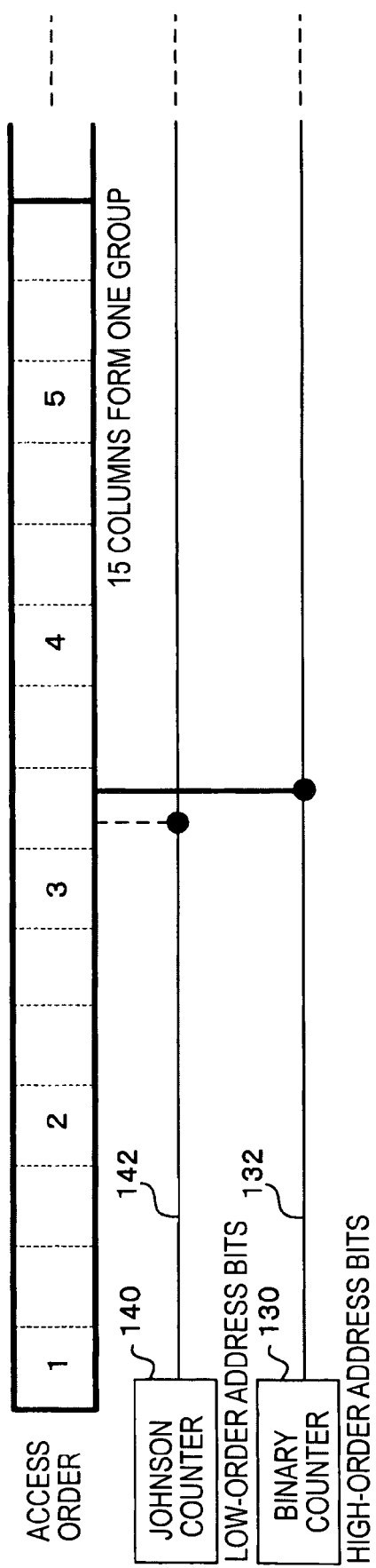
FIG. 19 is a diagram showing a manner in which addressing is performed such that an address value is incremented in steps of "3" according to a fifth embodiment of the invention.
Figure 20:
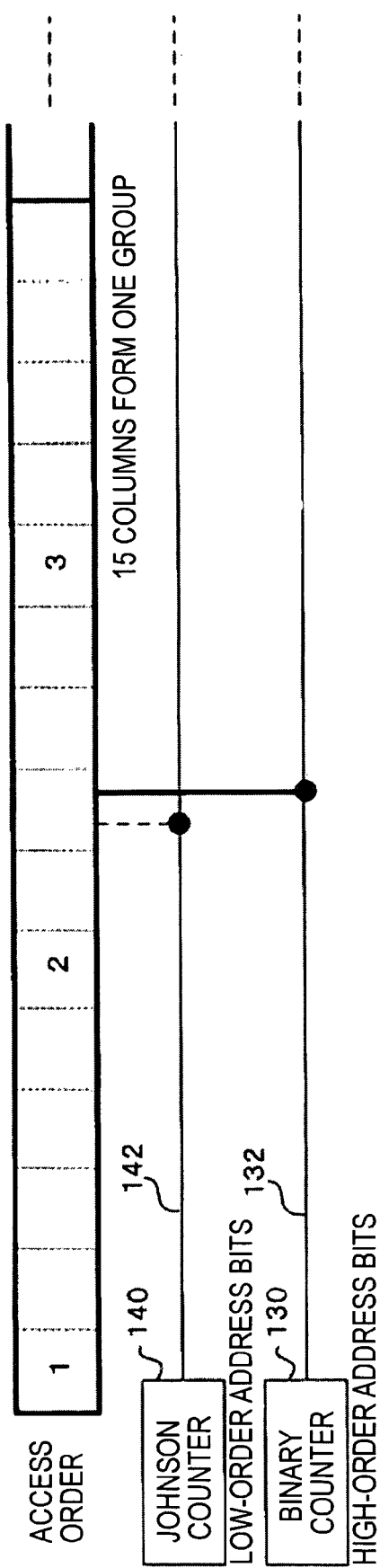
FIG. 20 is a diagram showing a manner in which addressing is performed such that an address value is incremented in steps of "5" according to the fifth embodiment of the invention.
Figure 23:
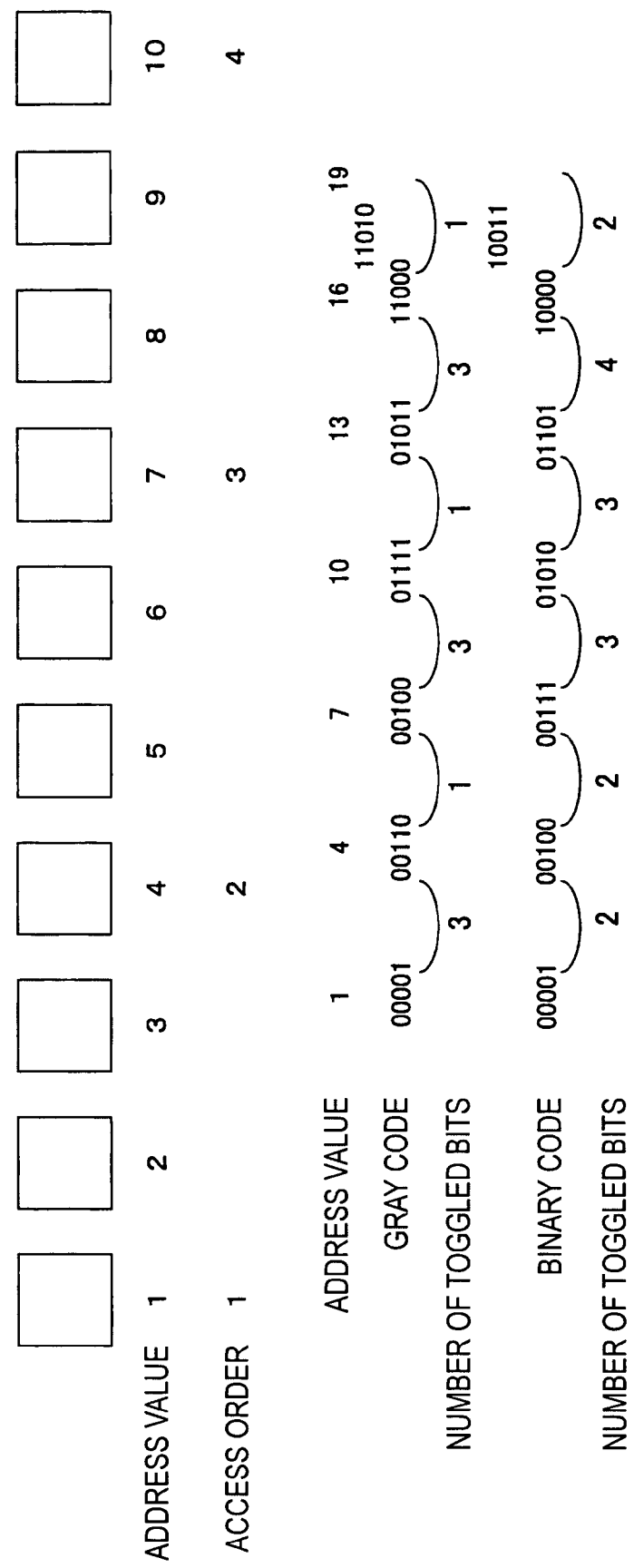
FIG. 23 is a diagram showing the relationship among accessed pixels, address values, and the number of toggled bits in the case in which the address value is increased in steps of "3" using a binary code and a gray code.
Figure 24:
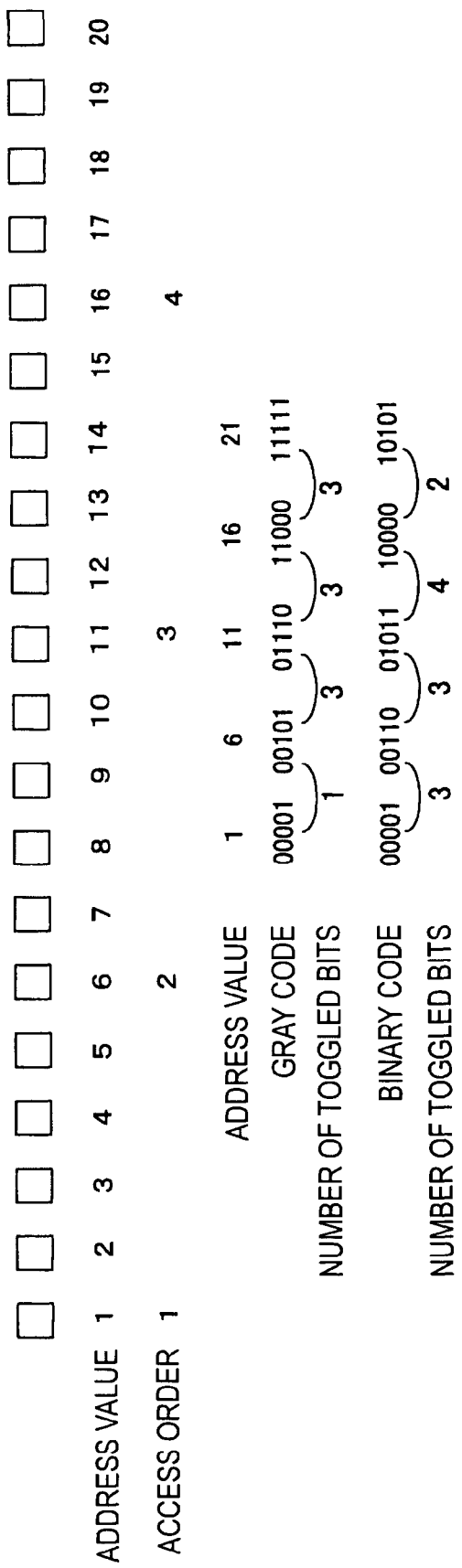
FIG. 24 is a diagram showing the relationship among accessed pixels, address values, and the number of toggled bits in the case in which the address value is increased in steps of "5" using a binary code and a gray code.

FIGS. 7 to 10 show examples of addressing for the image sensing part 10 of the solid-state image sensor 1 shown in FIG. 1 in accordance with a second embodiment of the present invention. In the example shown in FIG. 7, the address value is increased in steps of "4". In the example shown in FIG. 8, the address value is increased in steps of "5". FIG. 9 shows the relationship among accessed pixels, address values, and the number of toggled bits in the case in which the address value is increased in steps of "4". FIG. 10 shows the relationship among accessed pixels, address values, and the number of toggled bits in the case in which the address value is increased in steps of "5".

In this second embodiment, the basic part of the circuit is similar to that according to the first embodiment but the circuit is configured to be operable in additional two modes in which the address value is incremented in steps of "4" or "5" in addition to the basis mode. To this end, as many values as the least common multiple of "4" and "5", that is, "20" values (20 child values) are represented by the low-order bits of address value, and a particular value of the low-order bits of the address value is set by the ring shift register 110. The value of high-order bits of the address value (which specifies a group (parent) to which 15 child values belong) is set by the Gray code counter 120. That is, each address is represented by a combination of low-order bits (a child value) dealt with by the ring shift register 110 and high-order bits (parent value) dealt with by the Gray code counter 120, and the overall address is set cooperatively by the ring shift register 110 and the Gray code counter 120.

Thus, as in the first embodiment, the change in the number of toggled bits becomes smaller than that which occurs in a conventional address setting part using a binary code or a Gray code.

More specifically, when the address value is increased in steps of 4, the number of bits toggled in the ring shift register 110 is always equal to 2 as shown in FIG. 9, and toggling of one bit occurs in the Gray code counter 120 when the group is switched to a next group. Thus, also in this case, the total number of toggled bits is equal to "2" or "3".

On the other hand, when the address value is incremented in steps of "5", the number of bits toggled in the ring shift register 110 is always equal to 2 as shown in FIG. 10, and toggling of one bit occurs in the Gray code counter 120 when the group is switched to a next group. Thus, also in this case, the total number of toggled bits is equal to "2" or "3".

Thus, as in the first embodiment, the address setting part 21 as a whole can be configured in a simple form without needing any complicated circuit such that addressing can be performed while maintaining the number of toggled bits within a small range and thus random noise generated in the addressing operation can be minimized.

Although when the address value is incremented in steps of even numbers, the number of toggled bits is similar to that which occurs when the conventional configuration using the Gray code is used, the number of toggled bits is smaller when the address value is incremented in steps of odd numbers.

FIGS. 11 to 14 show examples of addressing for the image sensing part 10 of the solid-state image sensor 1 shown in FIG. 1 in accordance with a third embodiment of the present invention. In the example shown in FIG. 11, the address value is increased in steps of "3". In the example shown in FIG. 12, the address value is increased in steps of "5". FIG. 13 shows the relationship among accessed pixels, address values, and the number of toggled bits in the case in which the address value is increased in steps of "3". FIG. 14 shows the relationship among accessed pixels, address values, and the number of toggled bits in the case in which the address value is increased in steps of "5".

This third embodiment is similar to the first or second embodiment in that different types of counters are used for upper-order and low-order bits, but different in that the Gray code counter 120 used in the first or second embodiment is replaced with a binary counter 130 such that setting of the low-order bits of the address value is performed by the ring shift register 110 and the value of high-order bits of the address value which specifies a group (parent) to which 15 the low-order bits belong is set by the binary counter 130.

An address setting line 112 extends from the ring shift register 110, and an address setting line 132 extends from the binary counter 130 such that address signals are transmitted over the respective address setting lines 112 and 132.

In this third embodiment, to make it possible to operate not only in the normal mode but also in a mode in which the address value is incremented by "3" and a mode in which the address value is incremented by "5", as many values as the least common multiple of "3" and "5", that is, "15" values (15 child values) are represented by the low-order bits of address value as in the first and second embodiments, and setting of the low-order bits of the address value is performed by the ring shift register 110. The value of high-order bits of the address value (which specifies a group (parent) to which 15 child values belong) is set by the binary counter 130. That is, each address is represented by a combination of low-order bits (a child value) dealt with by the ring shift register 110 and high-order bits (parent value) dealt with by the binary counter 130, and the overall address is set cooperatively by the ring shift register 110 and the binary counter 130.

When the address value is increased in steps of "3", as shown in FIG. 13, the number of bits toggled in the ring shift register 110 is always equal to 2 as in the first and second embodiments. On the other hand, in the binary counter 130, toggling occurs in one or more bits (the number of toggled bits is denoted by α) when the group is switched to a next group. Thus, the total number of toggled bits is equal to "2+α", where α is the number of bits toggled in the binary counter 130.

When the address value is increased in steps of "5", as shown in FIG. 14, the number of bits toggled in the ring shift register 110 is always equal to 2 as in the first and second embodiments. On the other hand, in the binary counter 130, toggling occurs in one or more bits when the group is switched to a next group. Thus, the total number of toggled bits is equal to "2+α", where α is the number of bits toggled in the binary counter 130.

In any case, by dealing with low-order bits and high-order bits using different types of address setting parts, that is, by setting the low-order bits of the address value using the ring shift register 110 and the high-order bits of the address value using the binary counter 130, it becomes possible to maintain the change in the total number of toggled bits within a small range, which is not so small as in the first or second embodiment.

Although in the third embodiment, the number of toggled bits is not maintained in a small range compared with a conventional configuration using a single Gray code counter, the number of toggled bits is maintained at least within a smaller range when the address value varies, than can be by a conventional configuration using a single binary counter, and thus it is possible to prevent a significant problem due to random noise caused by toggling of bits that occurs when the address is set.

When a binary counter is used as in this third embodiment in which the binary counter 130 is used, toggling occurs in a large number of bits when a carry occurs. In particular, toggling occurs in the greatest number of bits when a carry from the highest-order bit to the lowest-order bit. Occurrence of toggling in such a large number of bits can be avoided if the Gray code counter 120 is used as in the first or second embodiment. In this respect, the first or second embodiment is more preferable than the third embodiment.

FIGS. 15 to 18 show examples of addressing for the image sensing part 10 of the solid-state image sensor 1 shown in FIG. 1 in accordance with a fourth embodiment of the present invention. In the example shown in FIG. 15, the address value is increased in steps of "3". In the example shown in FIG. 16, the address value is increased in steps of "5". FIG. 17 shows the relationship among accessed pixels, address values, and the number of toggled bits in the case in which the address value is increased in steps of "3". FIG. 18 shows the relationship among accessed pixels, address values, and the number of toggled bits in the case in which the address value is increased in steps of "5".

This fourth embodiment is similar to the first to third embodiments in that different types of counters are used for upper-order and low-order bits, but different in that the ring shift register 110 used in the first or second embodiment is replaced with a Johnson counter 140 such that and setting of the low-order bits of the address value is performed by the Johnson counter 140 and the value of high-order bits of the address value which specifies a group (parent) to which 15 the low-order bits belong is set by the Gray code counter 120.

An address setting line 142 extends from the Johnson counter 140, and an address setting line 122 extends from the Gray code counter 120 such that address signals are transmitted over the respective address setting lines 142 and 122.

Although the details of the structure of the Johnson counter 140 are not shown in the figures, the basic structure includes a closed loop in which an inverted signal output from the final stage of a shift register is fed back to the first stage of the shift register, and a fixed pattern of pulses is sequentially shifted to an adjacent output in synchronization with a clock signal. In this respect, the Johnson counter 140 is similar to the ring shift register 110. However, unlike the ring shift register 110, the Johnson counter 140 has the feature that output signals have a duty ratio of 50% and they overlap each other.

The advantage of the closed loop in which the inverted signal output from the first stage is fed back to the first stage appears at two low-order bits in the address value of "40" shown in FIG. 17 or at three low-order bits in the address value of "41" shown in FIG. 18.

In the Johnson counter 140, as in the ring shift register 110, a fixed pattern of pulses is sequentially shifted from one output to an adjacent output in synchronization with a clock signal. In the present embodiment, the shifting value is adjusted depending on the value in steps of which the address value is incremented. By using the Johnson counter 140, it is possible to reduce the number of toggled bits compared with the case in which the binary counter is used.

In this fourth embodiment, to make it possible to operate not only in the normal mode but also in a mode in which the address value is incremented by "3" and a mode in which the address value is incremented by "5", as many values as the least common multiple of "3" and "5", that is, "15" values (15 child values) are represented by the low-order bits of address value as in the first to third embodiments, and setting of the low-order bits of the address value is performed by the Johnson counter 140. The value of high-order bits of the address value (which specifies a group (parent) to which 15 child values belong) is set by the Gray code counter 120. That is, each address is represented by a combination of low-order bits (a child value) dealt with by the Johnson counter 140 and high-order bits (parent value) dealt with by the Gray code counter 120, and the overall address is set cooperatively by the Johnson counter 140 and the Gray code counter 120.

When the address value is increased in steps of "3", as shown in FIG. 17, the number of bits toggled in the Johnson counter 140 is equal to "3" or "4". On the other hand, in the Gray code counter 120, toggling of one bit occurs when the group is switched to a next group. Thus, the total number of toggled bits is within the range of 3 to 5.

When the address value is increased in steps of "5", as shown in FIG. 18, the number of bits toggled in the Johnson counter 140 is equal to "5" or "6". On the other hand, in the Gray code counter 120, toggling of one bit occurs when the group is switched to a next group. Thus, the total number of toggled bits is within the range of 5 to 7.

In any case, by dealing with low-order bits and high-order bits using different types of address setting parts, that is, by setting the low-order bits of the address value using the Johnson counter 140 and the high-order bits of the address value using the Gray code counter 120, it becomes possible to maintain the change in the total number of toggled bits within a small range, which is not so small as in the first or second embodiment. As in the first and second embodiments, the number of toggled bits does not change greatly regardless of the address value, and thus it is possible to prevent a significant problem due to random noise caused by toggling of bits that occurs when the address is set.

There is a difference in the number of toggled bits between the ring shift register 110 and the Johnson counter 140. That is, the number of bits toggled in the ring shift register 110 is always equal to 2, but the number of bits toggled in the Johnson counter 140 is equal to 3 (when the address value is incremented in steps of 3, and the number of toggled bits changes depending on the value by which the address value is incremented). The address setting units of these different types can be selectively used depending on whether it is desirable to control the number of toggled bits.

Although when the address value is incremented in steps of even numbers, the number of toggled bits is similar to that which occurs when the conventional configuration using the Gray code is used, the number of toggled bits is smaller when the address value is incremented in steps of odd numbers.

FIGS. 19 to 22 show examples of addressing for the image sensing part 10 of the solid-state image sensor 1 shown in FIG. 1 in accordance with a fifth embodiment of the present invention. In the example shown in FIG. 19, the address value is increased in steps of "3". In the example shown in FIG. 20, the address value is increased in steps of "5". FIG. 21 shows the relationship among accessed pixels, address values, and the number of toggled bits in the case in which the address value is increased in steps of "3". FIG. 22 shows the relationship among accessed pixels, address values, and the number of toggled bits in the case in which the address value is increased in steps of "5".

The fifth embodiment is a combination of the third embodiment and the fourth embodiment. That is, the fifth embodiment is similar to the first to fourth embodiments in that different types of counters are used for upper-order and low-order bits, but different in that the ring shift register 110 used in the first or second embodiment is replaced with a Johnson counter 140 such that setting of the low-order bits of the address value is performed by the Johnson counter 140 and the value of high-order bits of the address value which specifies a group (parent) to which 15 the low-order bits belong is set by the binary counter 130.

In this fifth embodiment, to make it possible to operate not only in the normal mode but also in a mode in which the address value is incremented by "3" and a mode in which the address value is incremented by "5", as many values as the least common multiple of "3" and "5", that is, "15" values (15 child values) are represented by the low-order bits of address value as in the first to fourth embodiments, and setting of the low-order bits of the address value is performed by the Johnson counter 140. The value of high-order bits of the address value (which specifies a group (parent) to which 15 child values belong) is set by the binary counter 130. That is, each address is represented by a combination of low-order bits (a child value) dealt with by the ring shift register 110 and high-order bits (parent value) dealt with by the binary counter 130, and the overall address is set cooperatively by the Johnson counter 140 and the binary counter 130.

When the address value is increased in steps of "3", as shown in FIG. 17, the number of bits toggled in the Johnson counter 140 is equal to "3" or "4". On the other hand, in the binary counter 130, toggling occurs in one or more bits when the group is switched to a next group. Thus, the total number of toggled bits is equal to 3+α or 4+α, where α is the number of bits toggled in the binary counter 130.

When the address value is increased in steps of "S", as shown in FIG. 18, the number of bits toggled in the Johnson counter 140 is equal to "5" or "6". On the other hand, in the binary counter 130, toggling occurs in one or more bits when the group is switched to a next group. Thus, the total number of toggled bits is equal to 5+α or 6+α, where α is the number of bits toggled in the binary counter 130.

In any case, by dealing with low-order bits and high-order bits using different types of address setting parts, that is, by setting the low-order bits of the address value using the Johnson counter 140 and the high-order bits of the address value using the binary counter 130, it becomes possible to maintain the change in the total number of toggled bits within a small range, which is not so small as in the first or second embodiment.

Although in the fifth embodiment, the number of toggled bits is not maintained in a small range compared with a conventional configuration using a single Gray code counter, the number of toggled bits is maintained at least within a smaller range when the address value varies, than can be by a conventional configuration using a single binary counter, and thus it is possible to prevent a significant problem due to random noise caused by toggling of bits that occurs when the address is set.

In this embodiment in which the binary counter 130 is used, toggling occurs in a large number of bits when a carry occurs, as in the third embodiment. In particular, toggling occurs in the greatest number of bits when a carry from the highest-order bit to the lowest-order bit. Occurrence of toggling in such a large number of bits can be avoided if the Gray code counter 120 is used as in the fourth embodiment. In this respect, the fourth embodiment is more preferable than the fifth embodiment.

In the present invention, as described above with reference to specific embodiments, an overall address setting unit is configured in the form of a combination of a plurality of address setting units of different types, and a high-order address value and a low-order address value are dealt with separately by different address setting units. More specifically, the address setting unit that deals with the low-order address value is formed using a ring shift register or a Johnson counter rather than a simple binary counter, thereby making it possible to reduce the number of toggled bits, and thus reduce the total number of toggled bits of an overall address value into a small range, which results in a reduction in random noise caused by the operation of setting addresses.

It is expected that the number of pixels of the CMOS image sensor will further increase, and the CMOS image sensor will provide a greater number of functions and a greater number of reading modes. The techniques disclosed in the embodiments described above will be advantageously applicable to complicated accessing to pixels in various modes in such future image sensors. The application of the techniques disclosed in the embodiments described above will make it possible to perform addressing while maintaining the number of toggled bits within a small range without needing a complicated circuit, which will result in a reduction in random noise caused by the address setting operation.

Although the present invention has been described above with reference to specific embodiments, the present invention is not limited to these embodiments. Various modifications and improvements are possible without departing from the sprit and the scope of the invention. Note that such modified or improved embodiments also fall within the scope of the invention.

The purpose of the embodiments described above is not to limit the invention. All parts, elements, or steps described in embodiments are not necessarily needed to practice the invention. The embodiments described above are in some of various aspects of the invention, and the invention can be embodied in many ways by combining parts, elements, and/or steps disclosed above. Some parts, elements, or steps may be removed from the embodiments described above, as long as the purpose of the invention can be achieved. Note that such embodiments achieved by removing some parts, elements or steps also fall within the scope of the invention.

Although in the embodiments described above, in invention is applied to controlling of read addresses in the image sensing device of the X-Y addressing type including a plurality of unit pixels arranged in the form of a two-dimensional array, the application of the present invention is not limited to the image sensing device of the X-Y addressing type. For example, the present invention can also be applied to a line sensor (one-line image sensing device) including a plurality of unit pixels arranged in the form of a linear array. As a matter of course, the present invention can also be applied to an image sensing device having a small number of rows.

In the embodiments described above, the present invention is applied to the column-type solid-state image sensor in which and CDS processors are disposed for respective columns, and voltage signals are output from pixels arranged along a row or a column. However, the solid-state image sensor is not limited to the column type. For example, the present invention may also be applied to a solid-state image sensor in which current signals are output from respective pixels. That is, the present invention may be applied to any solid-state image sensor, and similar advantages can be achieved, as long as signals are read from photosensor elements by means of addressing in a similar manner as with the solid-state image sensor of the X-Y addressing type.

The present invention can be applied not only to controlling of read addresses in image sensing devices but also to controlling of read addresses in semiconductor memories. In accordance with the teaching of the techniques disclosed in the embodiments descried above of the present invention, address values indicating reading positions can be advantageously controlled in any type of semiconductor device including an address controller that selects a unit element from a plurality of unit elements arranged in the form of a one-dimensional or two-dimensional array. An image signal captured by a CCD image sensor device may be stored in a page memory (or a frame memory, a field memory, etc.), and the image signal may be read later from the memory. The present invention can also be applied to controlling of addressing when the image signal is read from the memory. In any case, it is possible to achieve advantages similar to those achieved in the embodiments described above.

As described above, in the present invention, an address value is divided into a high-order address value and a low-order address value, and the high-order address value and the low-order address value are set by address setting units that operate differently from each other. The low-order address value setting unit has the capability of switching the value by which to increment the address value, but the high-order address value setting unit does not need to have the capability of switching the value by which to increment the high-order address value, and thus the high-order address value setting unit does not need to include a complicated circuit for switching the value by which to increment the high-order address value.

Thus, the overall address value setting unit can be configured in a simple form without needing any complicated circuit such that addressing can be performed while maintaining the number of toggled bits within a small range and thus random noise generated in the addressing operation can be minimized.

What is claimed is:

1. A method of controlling a read address, in a solid state imaging device comprising:
   generating image signals in a plurality of image elements arranged in a one-dimensional or two-dimensional array;
   specifying address values of the image elements from which to read at least some of the image signals in digital format comprised of bits;
   dividing each address value into a high order address value and a low order address value; and
   incrementing the high-order address value using a first counter while incrementing the low-order address values using a second counter, the first counter incrementing the high-order values such that a least number of individual bits of the high-order values are toggled, the second counter incrementing the low-order values such that the individual bits of the low-order values that are toggled is less that a number of bits of the low-order values that would be toggled using either a Gray code counter or a binary code counter.

2. A method of controlling a read address, according to claim 1, wherein a low order address value setting unit switches a value by which to increment the low order address value.

3. An imaging apparatus that reads unit-element signals from a solid state imaging device for detecting an image signal, the solid state imaging device including a plurality of image elements arranged in a particular order, each image element having an image element signal generator that outputs an image-signal indicating an incident light level, the imaging apparatus comprising:
   a low-order address value setting unit that sets a low-order address value of an address value indicating a location of one of imaged elements from which to read the image signal; and
   a high-order address value setting unit that sets a high-order address value of the address value indicating the location of one image element from which from which to read the image signal,
   wherein,
      the high-order and low-order address values are digital values comprised of bits,
      the high-order address value setting unit increments the high-order address value in a manner different from the manner in which the low-order address value setting unit increments the low-order address value, and
      the high-order address value setting unit includes a first counter that increments the high-order address values and the low-order address value setting unit includes a second counter that increments the low-order address values, the first counter incrementing the high-order values such that a least number of individual bits of the high-order values are toggled, the second counter incrementing the low-order values such that the individual bits of the low-order values that are toggled is less that a number of bits of the low-order values that would be toggled using either a Gray code counter or a binary code counter.

4. A physical information acquisition apparatus according to claim 3, wherein the low-order address value setting unit switches a value by which to increment the address value.

5. A physical information acquisition apparatus according to claim 3, wherein the low-order address value setting unit includes a shift register.

6. A physical information acquisition apparatus according to claim 5, wherein the high-order address value setting unit represents the high-order address value in a Gray code.

7. A physical information acquisition apparatus according to claim 5, wherein the high-order address value setting unit represents the high-order address value in a binary code.

8. A physical information acquisition apparatus according to claim 3, wherein the low-order address value setting unit includes a Johnson counter.

9. A physical information acquisition apparatus according to claim 8, wherein the high-order address value setting unit represents the high-order address value in a Gray code.

10. A physical information acquisition apparatus according to claim 8, wherein the high-order address value setting unit represents the high-order address value in a binary code.

11. A solid state imaging device including a plurality of image elements arranged in a particular order for detecting an image signal, each image element having an image-element signal generator that outputs an image-element signal indicating an incident light level, the solid state imaging device comprising:
- a low-order address value setting unit for setting a low-order address value of an address value indicating a location of one of the image elements from which to read the image signal; and
- a high-order address value setting unit for setting a high-order address value of the address value indicating the location of the one of the image elements from which to read the image signal, wherein,
- the high-order and low-order address values are digital values comprised of bits,
- the high-order address value setting unit increments the high-order address value in a manner different from the manner in which the low-order address value setting unit increments the low-order address value, and
- the high-order address value setting unit includes a first counter that increments the high-order address values and the low-order address value setting unit includes a second counter that increments the low-order address values, the first counter incrementing the high-order values such that a least number of individual bits of the high-order values are toggled, the second counter incrementing the low-order values such that the individual bits of the low-order values that are toggled is less that a number of bits of the low-order values that would be toggled using either a Gray code counter or a binary code counter.

12. The method of claim 1, wherein the first counter is a gray code counter and the second counter is a ring shift counter.

13. The method of claim 1, wherein the first counter is a binary code counter and the second counter is a ring shift counter.

14. The method of claim 1, wherein the first counter is a gray code counter and the second counter is a Johnson counter.

15. The method of claim 1, wherein the first counter is a binary code counter and the second counter is a Johnson counter.

16. The imaging apparatus of claim 3, wherein the first counter is a gray code counter and the second counter is a ring shift counter.

17. The imaging apparatus of claim 3, wherein the first counter is a binary code counter and the second counter is a ring shift counter.

18. The imaging apparatus of claim 3, wherein the first counter is a gray code counter and the second counter is a Johnson counter.

19. The imaging apparatus of claim 3, wherein the first counter is a binary code counter and the second counter is a Johnson counter.

* * * * *